United States Patent [19]

Okabe

[11] Patent Number: 5,375,219
[45] Date of Patent: Dec. 20, 1994

[54] COMMON SYSTEM WITH A PLURALITY OF PROCESSORS USING A COMMON MEMORY AND UTILIZING AN INTERRUPT SIGNAL

[75] Inventor: Toshihide Okabe, Kawasaki, Japan

[73] Assignee: Fujitsu Limited, Kawasaki, Japan

[21] Appl. No.: 43,587

[22] Filed: Apr. 5, 1993

Related U.S. Application Data

[63] Continuation of Ser. No. 431,898, Nov. 6, 1989, abandoned.

[30] Foreign Application Priority Data

Nov. 9, 1988 [JP] Japan ................. 63-282805

[51] Int. Cl.⁵ .............................. G06F 12/00
[52] U.S. Cl. .............. 395/425; 364/DIG. 1; 364/228.1
[58] Field of Search ... 364/200 MS File, 900 MS File; 395/425

[56] References Cited

U.S. PATENT DOCUMENTS

| | | | |
|---|---|---|---|
| 3,728,693 | 4/1973 | Macker et al. | 395/275 |
| 4,412,285 | 10/1983 | Neches et al. | 395/650 |
| 4,420,806 | 12/1983 | Johnson, Jr. et al. | 395/725 |
| 4,453,211 | 6/1984 | Askinazi et al. | 395/500 |
| 4,504,906 | 3/1985 | Itaya et al. | 395/325 |
| 4,780,812 | 10/1988 | Freestone et al. | 395/425 |
| 4,785,394 | 11/1988 | Fischer | 395/325 |
| 4,833,598 | 5/1989 | Imamura et al. | 395/650 |
| 4,862,354 | 8/1989 | Fiacconi et al. | 395/200 |
| 4,933,846 | 6/1990 | Humphrey et al. | 395/325 |
| 4,967,342 | 10/1990 | Lent et al. | 395/725 |
| 5,142,683 | 8/1992 | Burkhardt, Jr. et al. | 395/375 |

FOREIGN PATENT DOCUMENTS 0164972 12/1985 European Pat. Off. .
0201020 12/1986 European Pat. Off. .
59-75350 4/1984 Japan .

OTHER PUBLICATIONS

M. Morris Mano, Computer System Architecture (2nd Edition), 1982, pp. 50-54, 62-69, 102-113, 434-473.
Patent Abstracts Of Japan, vol. 8, No. 183 (p. 296) (1620), Aug. 23, 1984 for JP-A-59 75 350.
European Search Report, The Hague, Sep. 19, 1991.

Primary Examiner—Joseph L. Dixon
Assistant Examiner—Matthew M. Kim
Attorney, Agent, or Firm—Staas & Halsey

[57] ABSTRACT

A plurality of processors and a particular processor use a common memory. A requesting processor requesting communication with the particular processor writes data at a predetermined address of the common memory which corresponds to the requesting processor. Upon writing the data into the common memory, an interruption signal is produced to interrupt the particular processor. The particular processor processes the interruption signal and determines which of the plurality of processors requested the communication with the particular processor and reads data from the address area in the common memory which corresponds to the requesting processor, thereby enabling communication between the requesting and particular processors to be conducted.

3 Claims, 6 Drawing Sheets

Fig. 1

PRIOR ART

COMMON SYSTEM WITH A PLURALITY OF PROCESSORS USING A COMMON MEMORY AND UTILIZING AN INTERRUPT SIGNAL

This application is a continuation of application Ser. No. 07/431,898, filed Nov. 6, 1989, now abandoned.

BACKGROUND OF THE INVENTION

The present invention relates to a system for communicating between data processing systems and between units constituting a data processing system.

With the recent expansion in the variety of data processes, communication is carried out between data processing systems or between units constituting a data processing system.

Communication between units (apparatuses within the same system) or between adjacent systems, can be conducted through a memory commonly owned by those units.

Figure 1:
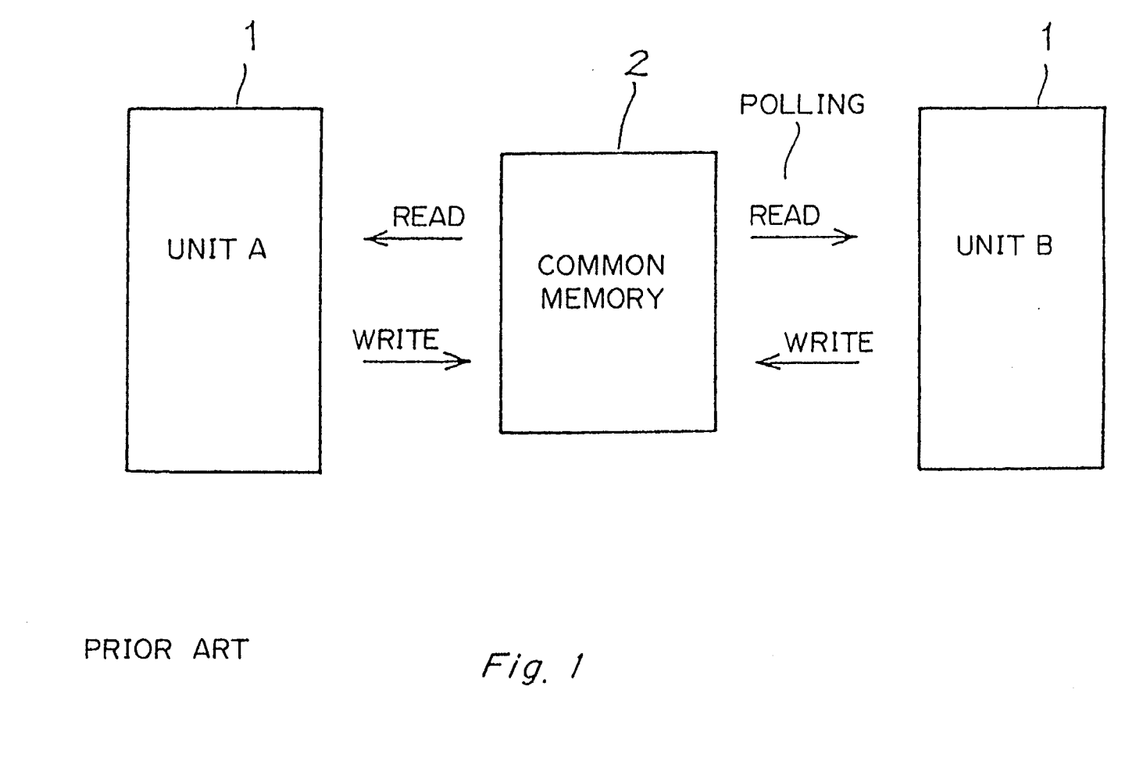
FIG. 1 shows a view for explaining the communication system according to the prior art.

In prior art systems data reading is carried out using a polling method. With this method, communication speed between units depends on the polling period, which limits the effectiveness of communication by the common memory. Therefore, a more effective communication method using a common memory is necessary. FIG. 1 shows a prior art communication system using a common memory.

According to the prior art common memory technology, a writable and readable memory is co-owned by a plurality of units (for example, unit A and unit B) 1 and a special meaning (for example, a command area or data area) is given to the predetermined address of the common memory 2.

When unit A1 intends to send something to unit B1, predetermined data such as commands are written in a predetermined address of the common memory by unit A1.

Unit B1 enables the data to be read out periodically from the previously defined address by using a well-known polling method and recognizes the above communication data transmitted from unit A1.

According to the communication system of the above prior art method, it is necessary for unit B1 to periodically perform polling to common memory 2. The communication speed depends on the polling period of unit B1 and therefore cannot reach the desired level.

SUMMARY OF THE INVENTION

An object of the present invention is to provide a communication system in which the communication speed using a common memory is not limited by the polling period of the common memory when, in a communication between data processing systems or between units constituting a data processing system, polling is conducted by the unit on the receiving side.

A feature of the present invention is to provide a communication system in which a common memory is used by a plurality of units comprising circuit for writing data in a predetermined address of the common memory in which the data transmitted from a first one of the units is stored, circuit for producing an interruption signal for interrupting a second one of the respective units based on the data transmitted to the common memory, and circuit for reading the data from the predetermined area of said common memory which corresponds to the first unit, based on an interruption process of the unit which receives the interruption signal produced by the interruption signal producing circuit, whereby a communication between first and second units can be conducted.

DETAILED DESCRIPTION OF THE PREFERRED EMBODIMENTS

Figure 2:
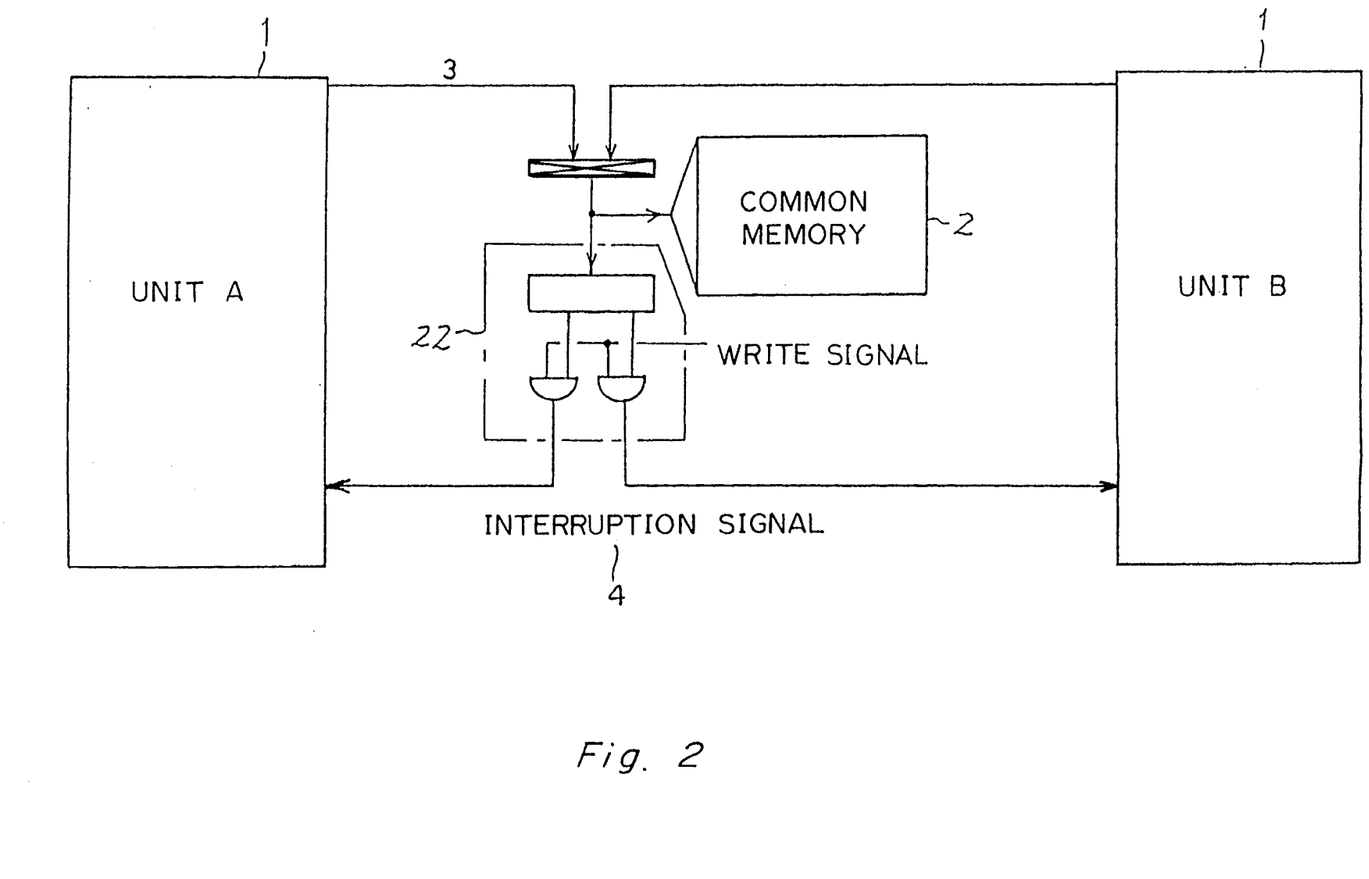
FIG. 2 shows the principle of a communication system according to the present invention.

As shown in FIG. 2, in a data processing system equipped with a plurality of units (A, B) 1 and common memory 2, an interruption signal 4 is transmitted from a unit (A) 1 to a unit (B) 1 in accordance with a writing 3 to a predetermined address of the common memory 2, the predetermined address in the common memory corresponding to unit (A). Unit (B) 1 receives an interruption signal 4 produced by unit 22. It performs an interruption process and reads the data in a predetermined area of the common memory 2, the predetermined area corresponding to the interruption signal, thereby performing communication between units.

The present invention provides a communication system between data processing systems and between units constituting a data processing system. When an event to be notified to a predetermined unit (for example unit (B) ) happens and a writing 3 corresponding to the event is conducted in the predetermined address of the common memory from the unit (A) and the address of the common memory is decoded by an address decoder 22, it produces an interruption signal 4 to the predetermined unit (B). The predetermined unit (B) receiving the interruption signal 4 reads the predetermined address corresponding to the kind of interruption signal 4 to recognize the content of the event. A predetermined event can be notified quickly from one unit (A) to another (B) and thus, the unit receiving the notification does not need to apply a polling process to the common memory 2. Therefore, the structure of a common control program of the units (A, B) is simplified, thereby increasing the processing capability of respective units (A, B).

Figure 3:
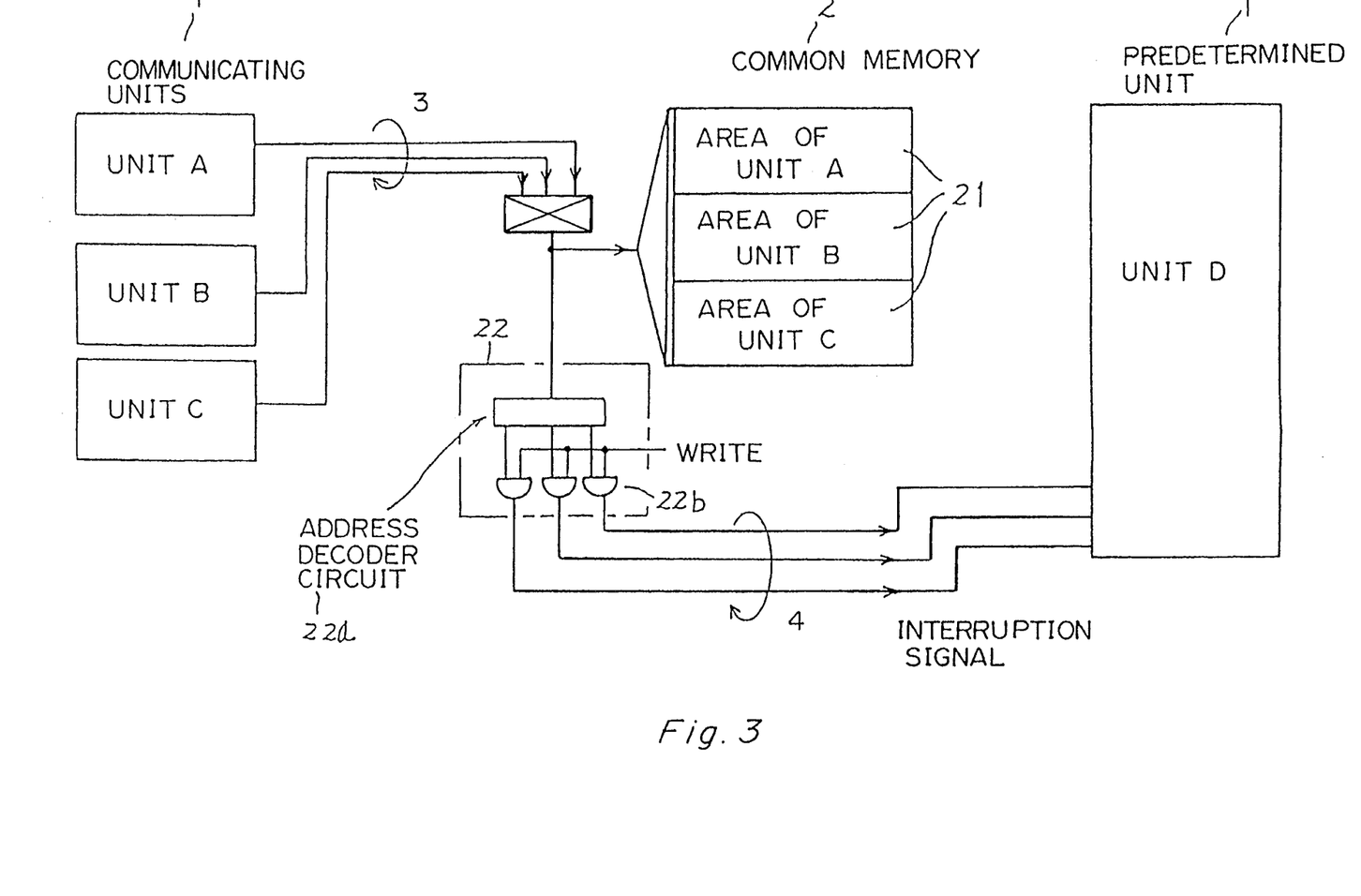
FIG. 3 shows a block diagram of an embodiment of the present invention.

FIG. 3 shows a block diagram of an embodiment of the present invention. A unit 22 decodes the address in which the data is written by a writing signal 3 in the common memory 2 from respective units (communication units A, B, C . . . ) 1 and produces an interruption signal 4 to the predetermined unit (D) 1. This unit 22 is important in realizing the present invention. The same reference numbers show the same items throughout all the drawings.

A communication system using a common memory according to the present invention will be explained by referring to FIG. 3 in more detail.

The embodiment illustrated in FIG. 3 does not relate to two-way communication but to one-way communication in which the data is transmitted from units (A, B, and C) to notify a certain event to unit (D). By expanding this system, a communication from a particular unit to a discretional unit can be realized.

When an event occurs in units (A, B, and C) it is notified to unit (D) 1. Then respective units (A, B, and C) write the item code, for example, on the address representing an area 21 corresponding to respective units in common memory 2.

Then three kinds of interruption signal 4 corresponding to units (A, B, and C) and writing signals 3 are produced by address decoder circuit 22a and transmitted to unit (D) 1 through logical product circuit 22b.

Unit (D) 1 reads the content of areas 21 of the common memory 2 (namely, the areas corresponding to units (A), (B) and (C)) which are previously determined in accordance with three kinds of interruption signals 4, thereby quickly recognizing the above notification event.

As described above, the present invention provides a system for communicating between data processing systems and between units forming a data processing system. It writes, via writing signal 3, a code of an event in an address corresponding to the units (A, B, and C) in the common memory 2 when the event occurring in respective units (A, B, and C) is notified to the predetermined unit (D). Then it produces an interruption signal 4 for the predetermined unit (D) by decoding the writing address in common memory 2, and notifies the predetermined unit (D) of the occurrence of the event by using different interruption signals 4.

As described above, the present communication system performs communication between data processing systems and units constituting a data processing system. A unit produces an interruption signal 4 to a predetermined unit (D) based on a writing signal 3 to a predetermined address of the common memory, the address corresponding to the unit (A, B or C). The interruption signal 4 produced by unit 22 is received through the interruption process for unit (D) 1 to read data at the predetermined address of the common memory in accordance with the interruption signal 4, thereby performing communication between units. A predetermined event can be notified from one unit to another at high speed and the unit receiving the notification does not need to perform a polling process to the common memory 2. This simplifies the structure of the control program in respective units (A, B, C, D . . . ) 1 and includes the processing capability of respective units.

Figure 4:
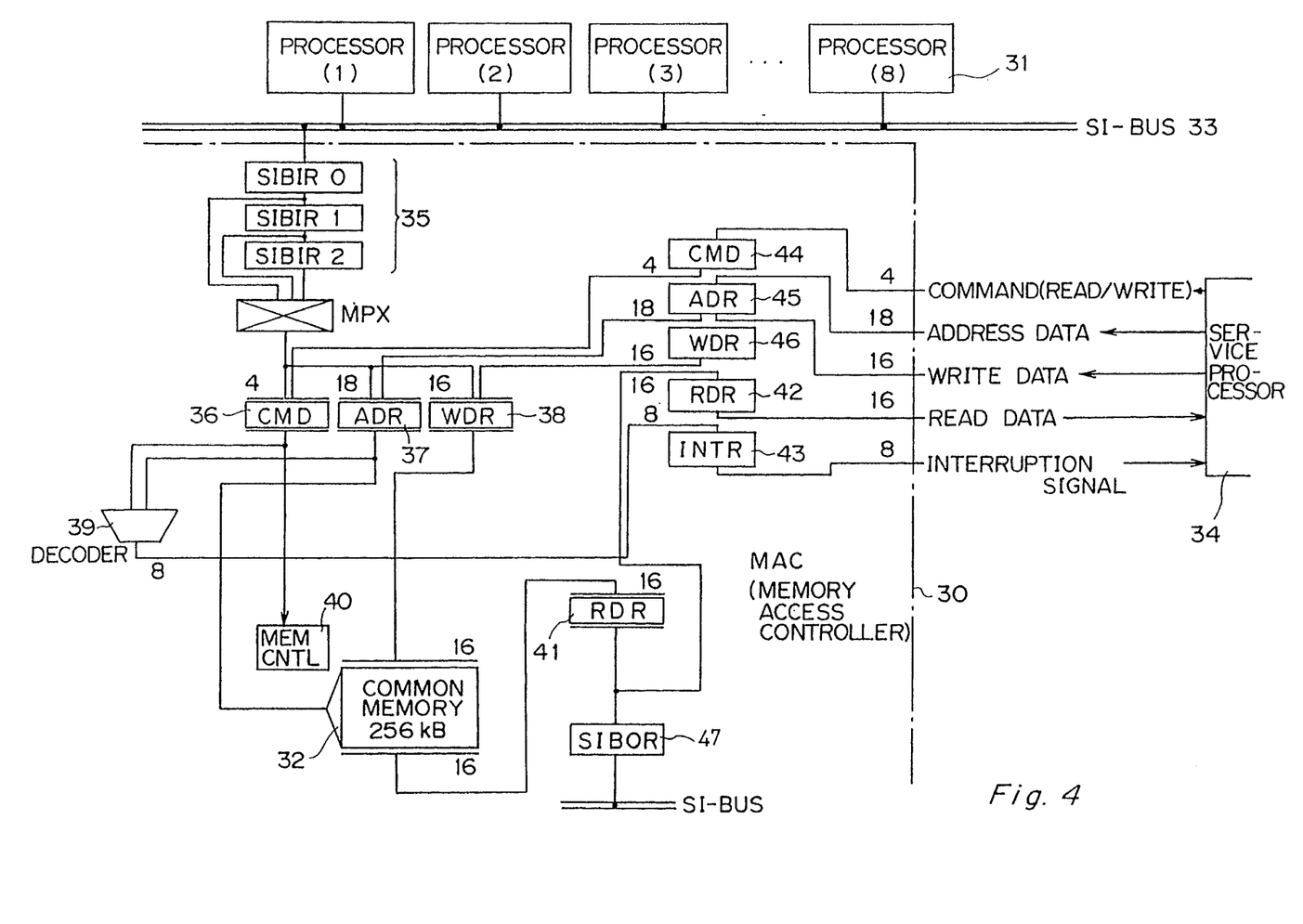
FIG. 4 shows a block diagram of the present embodiment in which the memory access controller in more detail.

A detailed circuit of a memory access controller (MAC) 30 of a communication system using a common memory in accordance with the present invention is shown in FIG. 4.

Processors (1), (2), (3) . . . (8) 31 are connected to common memory 32, through system information bus (SIBUS) 33 which is used as a common bus. Another processor corresponds to unit D of FIG. 3 and comprises a service processor (SVP) 34. The embodiment shown in FIG. 4 comprises 8 processors (1) . . . (8) 31 plus SVP 34 which communicates with them, thereby providing a communication control system using a common memory 32, in which N (8 in this example) vs. 1 communication is conducted. MAC 30 further comprises system information bus input registers (SIBIR (0), (1) and (2)) 35 and multiplexer (MPX), first command register (CMD) 36, first address register (ADR) 37 and first write data register (WDR) 38, decoder 39 and memory control logic circuit (MEM CNTL) 40, first read data register (RDR) 41, second read data register (RDR) 42, interruption register (INTR) 43, second command register (CMD) 44, second address register (ADR) 45, second write data register (WDR) 46 and system information bus output register (SIBOR) 47. The outputs of respective information bus input registers (SIBIR (0), (1) and (2)) 35 are connected to multiplexer (MPX). The output of the multiplexer (MPX) is connected to first command register (CMD) 36, first address register (ADR) 37 and first write data register (WDR) 38. The output of first command register (CMD) 36 and first address register (ADR) 37 are connected to decoder 39 and the output of first write data register 38 is connected to common memory 32. The output of first address register 37 is also connected to a gate (G) to provide the address signal for common memory 32. The data read from common memory 32 is set in first read data register (RDR) 41 and the output of first read data register 41 is provided to second read data register (RDR) 42. An interruption signal obtained by decoding the output from first command register (CMD) 36 and first address register (ADR) 37 by decoder 39 is set in interruption register (INTR) 43. System information buffer in register (SIBIR(0), (1) and (2)) 35 is formed to have three kinds of information set therein so that the differences in time between 4-bit-command, 18-bit-address and 16-bit-writing data is absorbed. The multiplexer (MPX) selects from the above three kinds of information. The selected information is set in a corresponding one of registers 36, 37 and 38 after being divided into 4-bit-command, 18-bit-address and 16-bit write data. Decoder 39 decodes the outputs of first command register 36 and first address register 37 as recited above.

First command register (CMD) 36 receives a write command and first address register 37 receives a particular address, thereby forming an 8-bit interruption signal. The 8-bit interruption signal corresponds to the request for the interruption received from processors (1) . . . (8) 31 and the thus-obtained interruption signal is set in interruption register (INTR) 43. When a write command is received by first command register (CMD) 36, memory controller (MEM CNTL) 40 performs a write control of common memory 32 by obtaining write data from first write register (WDR) 38 and stores the 16-bit write data in an address designated by first address register (ADR) 37. The storing areas correspond to respective processors (1) . . . (8) and the write data is stored in an area corresponding to the processor which requests an interruption operation. The interruption signal from the decoder 39 is set in interruption register 43 and is provided to service processor 34 as an interruption request signal. Service processor (SVP) 34 receives the interruption signal and determines which of bits 0 to 7 in interruption register 43 is 1 and enables an interruption process routine so that the communication area of the common memory 32 corresponding to the specified processor 1 to 8 are read. Therefore, service processor (SVP) 34 performs a read and write operation for common memory 32. Therefore, the 4-bit read command outputted from service processor (SVP) 34 is stored in the second command register (CMD) 44. This 4-bit command (CMD) is provided to memory controller (MEM CNTL) 40 through first command (CMD) register 36 to perform a read operation of common memory 32. When the data is read from the communication area of common memory 32, the reading address is provided by service processor (SVP) 34 as 18 bit address data through second address register (ADR) 45.

The read out content is provided to service processor (SVP) 34 through first and second read registers (RDR) 41 and 42. When the data is written to common memory 32 from service processor (SVP) 34, the write command is set in second command register (CMD) 44 and the write data is set in second write register (WDR) 46, thereby controlling memory controller (MEM CNTL) 40 to perform a write operation for common memory 32 by writing the write data into common memory 32.

Figure 5:
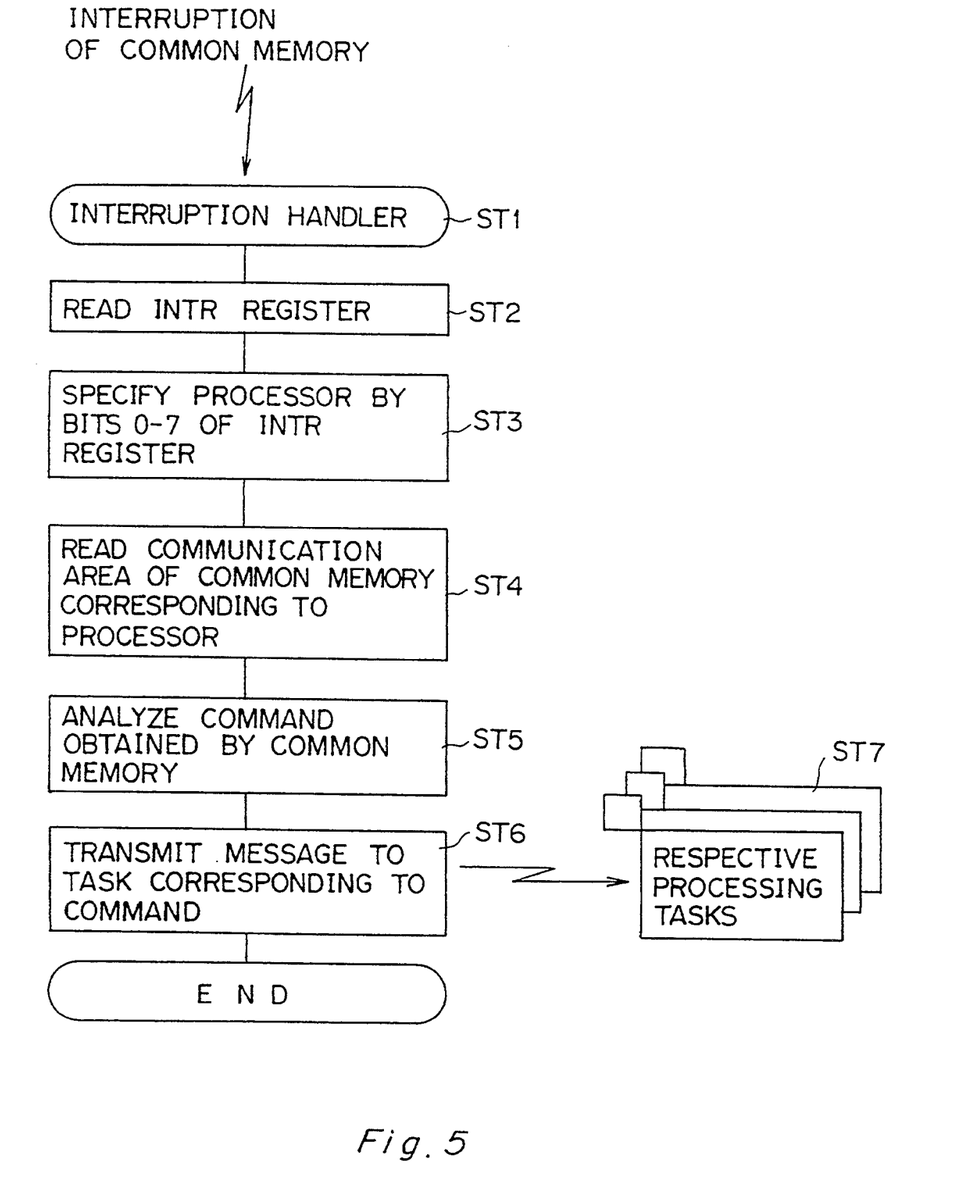
FIG. 5 shows a flowchart of an interruption routine conducted in a service processor.

FIG. 5 shows a flowchart of an interruption process routine applied to common memory 32 and is conducted by the service processor (SVP) 34. When an 8-bit interruption signal is provided in interruption register (INTR) 43, service processor (SVP) 34 enters an interruption process routine for common memory 32 and an interruption handler starts to operate (ST1). At first, the process reads 8-bit interruption signal from interruption register (INTR) 43 (ST2) and specifies (ST3) the processor number among the processors (1) to (8) depending on which of bits 0 to 7 is 1. When the processor (1) sends an interruption request to common memory 32, it stores the data in the area corresponding to the processor (1) in the common memory and the service processor (SVP) 34 executes a read operation for the communication area in common memory 32 (ST4), the communication area corresponding to the processor (1). Therefore, the service processor (SVP) 34 sets a read command and read address in the second command register (CMD) and the second address register (ADR) 45, respectively, to read common memory 32 and the content of common memory 32 is read out to service processor (SVP) 34. In step ST5, the process analyzes the command which is provided as a part of data obtained from the communication area of common memory 32, thereby transmitting the data as a message transmission to a task of the service processor (SVP) 34 in accordance with the command (ST6). As shown in FIG. 5, the service processor (SVP) 34 has a plurality of kinds of tasks corresponding to respective processes, and the data is transmitted to the respective tasks based on the result of the analysis of the command in accordance with data transmitted by the corresponding processor. Therefore, generally speaking, N vs. 1 communication is possible between processors (1) to (8) and service processor (SVP) 34.

Figure 6:
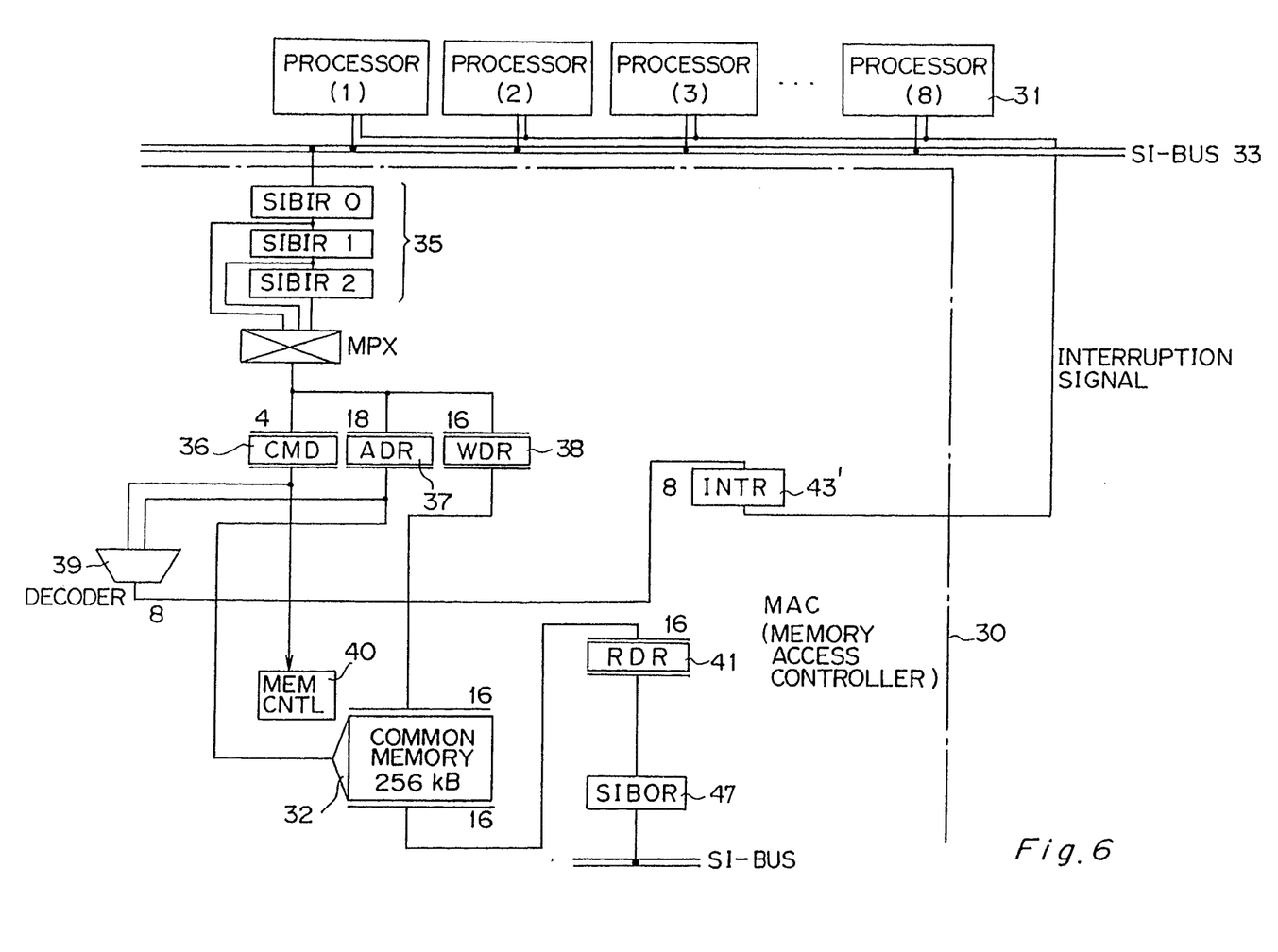
FIG. 6 is a block diagram of another embodiment of the present invention.

FIG. 6 shows a detailed diagram of the communication system using the common memory in a case of N vs. N processors. The same reference numbers as shown in FIG. 4 represent the same items. The embodiment shown in FIG. 6 differs from the embodiment shown in FIG. 4, which represents N vs. 1 communication case, as follows. Within memory access controller (MAC) 30, the output of decoder 39, namely, the interruption request signal of 8 bits is set in an interruption register (INTR) 43. In the previous embodiment shown in FIG. 4, the content of interruption register (INTR) 43 is sent to the service processor (SVP) 34, which is different from processors (1) to (8). However, in the embodiment shown in FIG. 6 the service processor (SVP) 34 is not used and the interruption signal is again transmitted to processors (1) to (8).

The interruption register (INTR) 43 contains 8 bits and respective bits correspond to processors (1) to (8). Respective processors are not requested by the interruption request signal issued by the processors themselves. Therefore, each of respective processors (1) to (8) masks a bit of the interruption signal, the bit corresponding to each of respective processors (1) to (8). Namely, the processor which issues the interruption request is different from the processor which receives the interruption signal. Thus, it becomes possible to perform a communication with other processors by using the interruption process signal.

Data are transmitted from processor (1), through system information bus (SIBUS) 33 and system information buffer input register (SIBIR 0 to 2) 35 in memory access controller (MAC) 30. Memory access controller (MAC) 30 sets these data in 4-bit command register (CMD) 36, 18-bit address register (ADR) 37 and 16-bit write register (WDR) 38, respectively. Decoder 39 decodes the 4-bit write command in command register (CMD) 36 to confirm that the data are for writing and uses the write command and an address provided by address register (ADR) 37 to provide an 8-bit interruption signal, thereby setting it in interruption register (INTR) 43'. In order to perform an interruption to processor (3), for example, the content of interruption register (INTR) 43' is provided such that the third bit is 1 and other bits are 0. Therefore, the signal read out from interruption register (INTR) 43' is sent to processors (1) to (8), but as the bit corresponding to processor (3) is "1", an interruption request is provided only to processor (3). Then, processor (3) performs an interruption process routine, and therefore, processor (3) provides a read command to common memory 32 through system information buffer input register (SIBIR) 35. Thus, an address is provided for access to a communication area of common memory 32. This area corresponds to the processor (1) as command register (CMD) 44 provides a READ command. Memory controller (MEM CNTL) 40 is controlled to perform a read operation and the read address is provided through read address register (ADR) 37. Then, data is read out from a communication area is common memory 32 corresponding to processor (1). The data are provided to system information bus (SIBUS) 33 through read data register (RDR) 41 and system information buffer output register (SIBOR) 46. The system information bus (SIBUS) 33 shown at the bottom of the drawing is the same as that shown in the top of the drawing. Therefore, the data is read out from common memory 32 to the processor (3). The data read out from common memory 32 are provided by processor (1), thereby enabling a communication from processor (1) to processor (3).

As stated above, according to the present invention, the data from respective processor units are written into a predetermined address of the common memory and an interruption signal for interrupting a predetermined processor is generated. This interruption signal is received by a different processor unit, thereby enabling the data on the predetermined area of the common memory to be read out in accordance with the interruption process and enabling a communication between units.

What is claimed is:

1. A communication system including first to n-th processing units using a common memory, each processing unit having a predetermined address in the common memory and transmitting data and a write signal simultaneously with the predetermined address, said communication system comprising:

writing means for simultaneously receiving from the first processing unit data, the write command signal and the predetermined address corresponding to the first processing unit and for writing the data at the predetermined address in the common memory, said writing means including a first command register, operatively connected to the first to n-th processors, for storing the write command signal from one of the first to n-th processors;

an address register, operatively connected to the first to n-th processors and the common memory, for storing the predetermined address of the common memory; and a write data register, operatively connected to the first to n-th processors and the common memory, for storing the data;

interrupt means for producing an interruption signal for interrupting a second processing unit included in the first to n-th processing units in parallel with the writing by said writing means, in response to the write command signal and the predetermined address from the first processing unit, said interrupt means including a decoder, operatively connected to said first command register and said address register, to produce the interruption signal in dependence upon the write command signal and the predetermined address stored in said address register; and an interruption register, operatively connected to said decoder and the second processor, for storing the interruption signal; and reading means for reading the data from the predetermined address of the common memory based on an interruption process of the second processing unit upon receipt of the interruption signal produced by said interrupt means to conduct communication between the first and second processing units, said reading means including a second command register, operatively connected to the second processor and said first command register, for storing a command from the second processor;

an address register, operatively connected to the second processor and said first address register, for storing an address in the common memory; and a read data register, operatively connected to the common memory and the second processor, for storing the data read from the common memory.

2. A communication system including N processors, one of the N processors included in each of first and second processing units using a common memory, each processor masking a bit corresponding to itself in an interruption signal to determine when communication is directed thereto, said communication system comprising:

writing means for simultaneously receiving from the first processing unit data, a write command signal and a predetermined address corresponding to the first processing unit and for writing the data at the predetermined address of the common memory, said writing means including a command register, operatively connected to processors, for storing a command from one of the processors;

an address register, operatively connected to the processors and the common memory, for storing in the common memory the predetermined address corresponding to the one of the processors; and a write data register, operatively connected to the processors and the common memory, for storing the data;

interrupt means for producing an interruption signal for interrupting the second processing unit in parallel with the writing by said writing means, in response to the write command signal and the predetermined address from the first processing unit, said interrupt means including a decoder, operatively connected to said command register and said address register, to produce the interruption signal in dependence upon the command and the predetermined address stored in said command and address registers, respectively; and an interruption register, operatively connected to said decoder and the processors for storing the interruption signal; and reading means for reading the data from the predetermined address of the common memory based on an interruption process of the second processing unit upon receipt of the interruption signal produced by said interrupt means to conduct communication between the first and second processing units, said reading means including a read data register, operatively connected to the common memory and the processors, for storing the data read from the common memory in accordance with the command stored in said command register and the predetermined address stored in said address register when the command is a read command.

3. A communication system including a first processing unit transmitting data to a second processing unit using a common memory, said communication system comprising:

writing means for simultaneously receiving from the first processing unit data, a write command signal and a predetermined address corresponding to the first processing unit and for writing the data in the common memory at the predetermined address;

interrupt means for producing an interruption signal for interrupting the second processing unit in parallel with the writing by said writing means, in response to the write command signal and the predetermined address from the first processing unit, said interrupt means including a decoder, operatively connected to the first and second processing units, for decoding the write command signal and the predetermined address to provide the interruption signal corresponding to the first processing unit, an interruption register operatively connected to said writing means and the second processing unit; and output means for outputting the interruption signal to the second processing unit; and reading means for accessing the common memory at the predetermined address in accordance with the interruption signal and in response to receipt of the interruption signal by the second processing unit, the second processing unit executing tasks corresponding to commands from the first processing unit and upon receipt of the interruption signal reading said interruption register, determining the predetermined address of the common memory which corresponds to the first processing unit, reading the data from the common memory, decoding a command included in the data and transmitting the data to one of the tasks, corresponding to the command, executing in the second processing unit.

* * * * *

UNITED STATES PATENT AND TRADEMARK OFFICE
CERTIFICATE OF CORRECTION

PATENT NO. : 5,375,219
DATED : December 20, 1994
INVENTOR(S) : T. Okabe

It is certified that error appears in the above-indentified patent and that said Letters Patent is hereby corrected as shown below:

On the Title Page, item [54] and column 1, line 2, delete "COMMON" and insert --COMMUNICATION--.

Col. 1, line 66, delete "said" and insert --the--.

Col. 2, line 13, after "controller" insert --is shown--.

Col. 5, line 51, after "represents" insert --the--.

Col. 6, line 36, delete "is" and insert --in--.

Col. 7, lines 2, 20, 36 and 61, after "including" insert -- - -- line 59, after "to" insert --the--.

Col. 8, lines 9 and 45, after "including" insert -- - --.

Signed and Sealed this

Thirteenth Day of June, 1995

Attest:

BRUCE LEHMAN

Attesting Officer

Commissioner of Patents and Trademarks